United States Patent Office 3,523,789
Patented Aug. 11, 1970

3,523,789
TERNARY ALUMINUM-COPPER-CADMIUM ALLOY
Shiro Kudo, Seiichi Yada, and Takayoshi Yamauchi, Sakai-shi, Japan, assignors to Kyowa Hakko Kogyo Co., Ltd., Tokyo, Japan, a corporation of Japan
No Drawing. Original application June 23, 1965, Ser. No. 466,435, now Patent No. 3,412,042, dated Nov. 19, 1968. Divided and this application Oct. 28, 1966, Ser. No. 605,112
Claims priority, application Japan, Sept. 22, 1964, 39/53,896
Int. Cl. C22c 9/00, 21/00
U.S. Cl. 75—134          3 Claims

ABSTRACT OF THE DISCLOSURE

A tertiary alloy consisting of aluminum, cadmium and copper in specified proportions is used as a starting material in the preparation of Raney-type ternary alloy catalyst useful in selective hydrogenation of $\alpha,\beta$-unsaturated carbonyl compounds, unsaturated fatty acids and unsaturated fatty acid esters.

---

This application is a division of copending application, Ser. No. 466,435, filed June 23, 1965, now Pat. No. 3,412,042 which is a continuation-in-part of copending application Ser. No. 340,485, filed Jan. 27, 1964 (now abandoned), which is in turn a continuation-in-part of application Ser. No. 223,249, filed Sept. 12, 1962 and now abandoned.

The present invention embodies two aspects, both involving to new catalysts, their production, and their use.

In the first aspect, the catalyst is a Raney copper cadmium catalyst prepared from a ternary alloy of about 30 to 60 percent by weight of aluminum and the remainder copper and cadmium. The cadmium content is about 4 to 15 percent by weight of said remainder, and the copper content is about 96 to 85 percent by weight of said remainder.

In the second aspect, the catalyst is a Raney copper cadmium catalyst prepared from a ternary alloy of about 30 to 60 percent by weight of aluminum, the remainder being copper and cadmium. The cadmium content is about 1 to slightly less than 4 percent by weight of said remainder, and the copper content is from a little more than 96 to about 99 percent by weight of said remainder.

Said catalysts are used in the production of $\alpha,\beta$-unsaturated alcohols by hydrogenating $\alpha,\beta$-unsaturated aldehydes and by hydrogenating $\alpha,\beta$-unsaturated ketones. Said catalysts are also useful in the production of unsaturated higher aliphatic alcohols by hydrogenating either unsaturated fatty acids or unsaturated fatty acid esters.

In hydrogenating $\alpha,\beta$-unsaturated aldehydes and ketones using an ordinary hydrogenation catalyst, it is very difficult to produce the corresponding unsaturated alcohol in a satisfactory yield, since the double bond in the unsaturated aldehyde or ketone is more easily hydrogenated than the carbonyl group.

The present catalysts are hydrogenation catalysts which have a high degree of specificity and which permit the production of $\alpha,\beta$-unsaturated alcohols from $\alpha,\beta$-unsaturated carbonyl compounds through selective hydrogenation with a high yield.

Thus, an object of the invention is to provide novel active hydrogenation catalysts to be used for the production of $\alpha,\beta$-unsaturated alcohols by selective hydrogenation of $\alpha,\beta$-unsaturated carbonyl compounds. Another object of the invention is to provide a method for preparing such catalysts to be used for the production of $\alpha,\beta$-unsaturated alcohols by selective hydrogenation of $\alpha,\beta$-unsaturated carbonyl compounds.

Other objects are apparent from the following description.

The invention, in the first aspect, provides a method for preparing a catalyst used for the production of $\alpha,\beta$-unsaturated alcohols by hydrogenation of $\alpha,\beta$-unsaturated carbonyl compounds in gaseous phase, which comprises melting a mixture of aluminum, copper and cadmium containing 30 to 60% by weight of aluminum, and the remainder of copper and cadmium, the proportion of cadmium in the remainder being 4 to 15% by weight, to form a molten ternary alloy, rapidly cooling and then pulverizing said alloy, treating said pulverized alloy with an aqueous alkali solution, washing said alloy with water and removing the resultant Raney copper cadmium catalyst composition. A catalyst composition is obtained which is effective in the hydrogenation process of this invention. It is highly selective and will accomplish the objects of the invention.

The resultant catalyst composition is a Raney copper cadmium catalyst which possesses a high degree of selectivity. It is composed essentially of 1 to 50 percent by weight of aluminum and a remainder of cadmium and copper with cadmium being 4 to 15 percent by weight of this remainder. The surface area of the catalysts ranges from 5 to 70 square meters per gram ($m.^2/g.$). The composition which is preferred is that which is prepared from ternary alloy containing 40 to 50 percent by weight (wt. percent) of aluminum, 3 to 7 wt. percent cadmium and 43 to 57 wt. percent copper.

The invention, in the second aspect, provides a method for preparing a catalyst useful for producing $\alpha,\beta$-unsaturated alcohols by hydrogenating $\alpha,\beta$-unsaturated aldehydes and/or ketones. Said catalyst is also useful in the production of unsaturated higher aliphatic alcohols by hydrogenating either unsaturated fatty acids or unsaturated fatty acid esters.

The method described supra is also useful for the preparation of the second catalyst except that the starting mixture contains from 30 to 70% by weight of aluminum, the remainder being cadmium and copper. The cadmium content is about 1 to less than 4% by weight of said remainder and the copper content is from a little more than 96 to about 99% by weight of said remainder. After melting this mixture, to form a molten ternary alloy, rapidly cooling and then pulverizing said alloy, treating said pulverized alloy with an aqueous alkali solution, washing said alloy with water, there is formed a Raney copper cadmium catalyst composition containing 1 to 60 percent by weight of aluminum and a remainder of cadmium and copper, with cadmium being 1 to less than 4 percent by weight of this remainder. The surface area of the catalyst ranges from 5 to 70 square meters per gram ($m.^2/g.$).

The Raney copper cadmium catalysts of the invention are prepared, for example, as follows. Melting the alloy may be effected in a graphite crucible using an electrofurnace. For easier preparation of the ternary alloy of a definite composition, it is convenient preliminarily to prepare binary alloys of aluminum-copper and cadmium-copper of definite compositions, and then to fuse these mother alloys together to make the ternary alloy. The molten alloy is well agitated with a silica rod, poured out from the graphite crucible onto a floor to form a plate 2 to 3 mm. thick, cooled by water, and crushed to 2 to 3 mm. particles.

The alloy particles are treated with an aqueous alkali solution, such as sodium or potassium hydroxide solution, washed with water, heated, and then used for the hydrogenation. Upon the alkali-treatment, a greater part of the aluminum is dissolved out, as in the alkali treatment of usual Raney-type catalyst.

EXAMPLE 1

Melt 176 g. (grams) of binary alloy block of aluminum-copper (40:48 by weight) in a No. 2 graphite crucible heated to about 700° C. by an electro-furnace. Add 24 g. of binary alloy block of cadmium-copper (1:1 by weight) thereinto under agitation. Agitate the resulting molten alloy well with a silica rod and pour out onto a floor to make a plate of 2 to 3 mm. (millimeters) thickness. Cool said alloy rapidly with water. After cooling, crush the alloy into 2 to 3 mm. particles.

Submerge fifty grams of the alloy in 1 kg. (kilogram) of aqueous 5% caustic soda solution at 100° to 101° C. for 2 hours, whereby a greater part of the aluminum in the alloy is dissolved out. After removal of the alkali solution, continually wash the alloy with 3 liters of water under a hydrogen stream of 50 to 100 mm. Hg, and then fill a reaction tube with the catalyst from the top under a hydrogen stream.

The following Table 1 shows the results of hydrogenation of crotonaldehyde by use of the resulting catalyst, and those by use of catalyst obtained by heat-treatment of the filled catalyst at 275° C. under a hydrogen stream for 3 hours.

thoroughly stirring the content. Discharge the resulting alloy on a floor while stirring with a silica rod. Immediately cool said resulting alloy rapidly with water and crush into a grain size of 200 to 250 mesh. The resulting alloy has a composition (wt. percent Cu:Cd:Al) of 50.0:5.0:45.0. Submerge 10 g. of the thus obtained alloy grains in 1000 g. of 10% aqueous caustic soda solution at 30° C. for 15 minutes. Upon the alkali-treatment, most of the aluminum is dissolved out.

After the treatment, discard the alkali liquid and wash the thus obtained catalyst grains with water until the wash water is neutral. The resulting catalyst has a composition (wt. percent Cu:Cd:Al) of 88.0:8.6:3.2; and a surface area (m.$^2$/g.) of 25.0. Fill a quartz tube with the catalyst grains and heat said grains at 300° C. for 3 hours in a hydrogen current.

Add 3 g. of the above catalyst to 100 g. of methyl oleate (iodine number:89.1, saponification value:192.3, acid number:0). Charge the resulting mixture in a shaking-type autoclave having an inner volume of 1 l. (liter). Shake in the autoclave for 120 minutes at 260° C. under an initial hydrogen pressure of 120 kg./cm.$^2$ (kilograms per square centimeter) at 20° C., and cool. The reaction product has an iodine number of 72.8, an acid number of 54.1 and a hydroxyl value of 160.0. The hydroxyl value is the weight (mg.) of caustic potassium required for neutralizing acetic acid formed by decom-

TABLE 1

| Alloy composition (wt. percent) Cu:Cd:Al | Catalyst Composition (wt. percent) Cu:Cd:Al | Surface area (m.$^2$/g.) | Treatment | Reaction pressure (kg./cm.$^2$ abs.) | Reaction temp. (° C.) | Liquid space velocity (l./l. hr.) | Conversion (percent) | Yield (percent) |
|---|---|---|---|---|---|---|---|---|
| 54.0:6.0:40.0 | 72.9:8.1:19.0 | 19.0 | 275° C., 3 hrs. under H$_2$. | 1 | 125 | 0.66 | 2.0 | 28.3 |
|  |  |  |  | 1 | 175 | 0.55 | 12.6 | 80.9 |
|  |  |  |  | 1 | 225 | 0.60 | 26.8 | 79.0 |
|  |  | 19.3 | Without heating. | 1 | 125 | 0.60 | 35.3 | 15.0 |
|  |  |  |  | 1 | 175 | 0.58 | 48.9 | 32.3 |
|  |  |  |  | 1 | 225 | 0.54 | 55.6 | 59.8 |

EXAMPLE 2

Although the employment of the Raney copper cadmium catalyst prepared from varied composition of the alloy in each example obviates the influence of the proportion of catalyst metals in the alloy to activity and selectivity of the catalyst, Table 2 further clarifies the results where the proportions of copper and cadmium are changed (at the constant amount of aluminum) in the alloy in the hydrogenation of crotonaldehyde to crotyl alcohol. Also, Table 2 reflects the use of a small proportion of aluminum in the catalyst.

posing the acetylated product obtained by acetylating 1 g. of the sample.

EXAMPLE 4

A graphite crucible was heated at about a temperature of 700° C. in an electric furnace. 194 g. of two component alloy mass consisting of aluminum and copper in a proportion of 50:47 by weight were melted in this crucible. Then 6 g. of two component alloy mass consisting of cadmium and copper in a proportion of 1:1 by weight was introduced therein while stirring. While being stirred well by a bar of silica, the content was discharged on a

TABLE 2

| Alloy composition (wt. percent) Cu:Cd:Al | Catalyst Composition (wt. percent) Cu:Cd:Al | Surface area (m.$^2$/g.) | Heat Treatment | Reaction pressure (kg./cm.$^2$ abs.) | Reaction temp. (° C.) | Liquid space velocity (l./l. hr.) | Conversion (percent) | Yield (percent) |
|---|---|---|---|---|---|---|---|---|
| 45.9:4.1:50.0 | 76.0:6.8:17.2 | 30.1 | Heated at 275° C. 3 hrs. under H$_2$ | 3 | 225 | 0.58 | 31.0 | 84.3 |
| 47.9:1.7:50.4 | 78.9:2.8:18.3 | 30.2 |  | 3 | 225 | 0.70 | 98.0 | 9.1 |
| 43.4:6.2:50.4 | 72.0:10.3:17.7 | 31.0 |  | 3 | 225 | 0.58 | 29.6 | 81.6 |
| 60.1:6.0:33.9 | 71.1:7.1:21.8 | 8.0 |  | 3 | 225 | 0.60 | 32.1 | 78.8 |

The present invention is further illustrated with reference to the following examples, wherein the analytical values of each reaction product are measured on substance obtained by thoroughly saponifying the product after the removal of the catalyst, treating the saponified product with hydrochloric acid, washing the treated substance with water and then topping the same under reduced pressure to remove methanol or butanol completely.

EXAMPLE 3

In an electric furnace, heat a graphite crucible to about 700° C. Melt 180 g. (grams) of an aluminum-copper (1:1 by weight ratio) binary alloy lump in the crucible. Subsequently, charge 20 g. of a cadmium-copper (1:1 by weight ratio) binary alloy lump in the crucible, while floor, immediately cooled by water and after being cooled, crushed to 200 to 250 mesh.

10 g. of the resulting alloy was treated with 1 kg. of 10 percent aqueous solution of sodium hydroxide at a temperature of 30° C. for 15 minutes. After this treatment, the alkaline solution was discarded, and the alloy was washed with water until washed solution becomes natural. The washed alloy was filled in a quartz tube and treated in a hydrogen atmosphere at a temperature of 290° C. for 3 hours.

5 g. of the above-mentioned catalyst was added to 100 g. of butyl oleate (iodine value 76.8, saponification value 168.2 and acid value 0.1). This mixture was charged in an autoclave having an internal volume of 1 liter and equipped with a stirrer and allowed to react at an initial hydrogen pressure of 130 kg./cm.² (at 20° C.), at a temperature of 265° C. for 150 minutes. The analytical values of the product formed were as follows: iodine value 70.3, acid value 49.8, hydroxyl value 157.0. The hydroxyl value was expressed as milligrams of potassium hydroxide required to neutralize acetic acid produced by decomposing 1 gram of the acetylated product.

EXAMPLE 5

198.4 g. of a two component alloy mass consisting of aluminum and copper in a proportion of 34:15.6 by weight and 1.6 g. of a two component alloy mass consisting of cadmium and copper in a proportion of 1:1 were melted in a crucible by the method set forth in Example 4, while being stirred well, discharged on a floor, immediately cooled by water and after being cooled, crushed into lumps of 3 to 5 millimeters.

50 g. of the crushed alloy was treated in 700 g. of 10 percent sodium hydroxide solution at a temperature ranging from 100° to 101° C. for 3 hours and washed sufficiently with water after discarding the alkaline solution. The treated alloy was added to the middle of a reaction tube made of SUS (trade name of a Japanese stainless steel manufacturer) and having an internal diameter of 18 mm. and length of 400 mm. and subjected to heat treatment at a temperature of 275° C. for 3 hours under a hydrogen atmosphere. The so-obtained catalyst was used for hydrogenation of 6-methyl-Δ³-tetrahydrobenzaldehyde.

What is claimed is:

1. A ternary alloy comprising aluminum, cadmium and copper wherein the weight percent of aluminum is about 30 to 60% and the weight percent of cadmium is about 4 to 15% of the remainder, the essential balance being copper.

2. A ternary alloy comprising aluminum, cadmium and copper wherein the weight percent of aluminum is about 30 to 60% and the weight percent of cadmium is about 1 to slightly less than 4% of the remainder, the essential balance being copper.

3. A ternary alloy comprising aluminum, cadmium and copper wherein the weight percent of aluminum is about 30 to 70% and the weight percent of cadmium is about 1 to slightly less than 4% of the remainder, the essential balance being copper.

References Cited

UNITED STATES PATENTS

| 3,355,282 | 11/1967 | Kudo et al. | 75—139 |
| 2,026,551 | 1/1936 | Fink | 75—139 |
| 1,658,757 | 2/1928 | Bernhoeft | 75—139 |

FOREIGN PATENTS

| 16,453 | 1903 | Great Britain. |

RICHARD O. DEAN, Primary Examiner

U.S. Cl. X.R.

75—139, 162